US012605659B2

(12) United States Patent (10) Patent No.: US 12,605,659 B2
Frankenberger (45) Date of Patent: Apr. 21, 2026

(54) CONVEYOR-BELT FILTERING DEVICE FOR MECHANICALLY CLEANING A LIQUID

(71) Applicant: FSM Frankenberger GmbH, Berlin (DE)

(72) Inventor: Guido Frankenberger, Wetzlar (DE)

(73) Assignee: FSM Frankenberger GmbH, Berlin (DE)

( * ) Notice: Subject to any disclaimer, the term of this patent is extended or adjusted under 35 U.S.C. 154(b) by 424 days.

(21) Appl. No.: 18/101,263

(22) Filed: Jan. 25, 2023

(65) Prior Publication Data

US 2023/0233965 A1 Jul. 27, 2023

(30) Foreign Application Priority Data

Jan. 26, 2022 (DE) ..................... 10 2022 101 756.7

(51) Int. Cl.
B01D 33/333 (2006.01)
B01D 33/327 (2006.01)
B01D 33/46 (2006.01)
B01D 33/76 (2006.01)
E03F 5/14 (2006.01)

(52) U.S. Cl.
CPC ......... B01D 33/333 (2013.01); B01D 33/327 (2013.01); B01D 33/461 (2013.01); B01D 33/76 (2013.01); E03F 5/14 (2013.01)

(58) Field of Classification Search
CPC .. B01D 33/333; B01D 33/327; B01D 33/461; B01D 33/76; B01D 33/048; B01D 33/056; B01D 33/04; E03F 5/14; E02B 8/023
See application file for complete search history.

(56) References Cited

U.S. PATENT DOCUMENTS

2006/0185967 A1 8/2006 Sedlacek et al.
2014/0374337 A1* 12/2014 Frankenberger ........ E02B 8/026
                                                    210/396
2015/0157965 A1* 6/2015 Strain .................... B01D 33/64
                                                    210/104
2016/0096126 A1* 4/2016 Frankenberger ..... B01D 33/333
                                                    210/160
2016/0230379 A1* 8/2016 Frankenberger ...... C02F 11/123

FOREIGN PATENT DOCUMENTS

CN      215137581      12/2021
DE      102013212081   1/2015
DE      102016213486   1/2018

OTHER PUBLICATIONS

Machine Translation of DE 10 2013 212 081 A1, Google Patents.

* cited by examiner

*Primary Examiner* — Hayden Brewster
(74) *Attorney, Agent, or Firm* — Warren D. Schickli; Stites & Harbison PLLC

(57) ABSTRACT

A conveyor-belt filtering device includes an endless filtering belt, which has at least one filtering element, a frame, a lower deflection apparatus and at least one upper deflection apparatus. The endless filtering belt has at least one collecting element, which is adapted for collecting foreign solids, in particular sand, stones, pebbles or the like, which are present in the liquid, in particular in an area of the lower deflection apparatus.

10 Claims, 5 Drawing Sheets

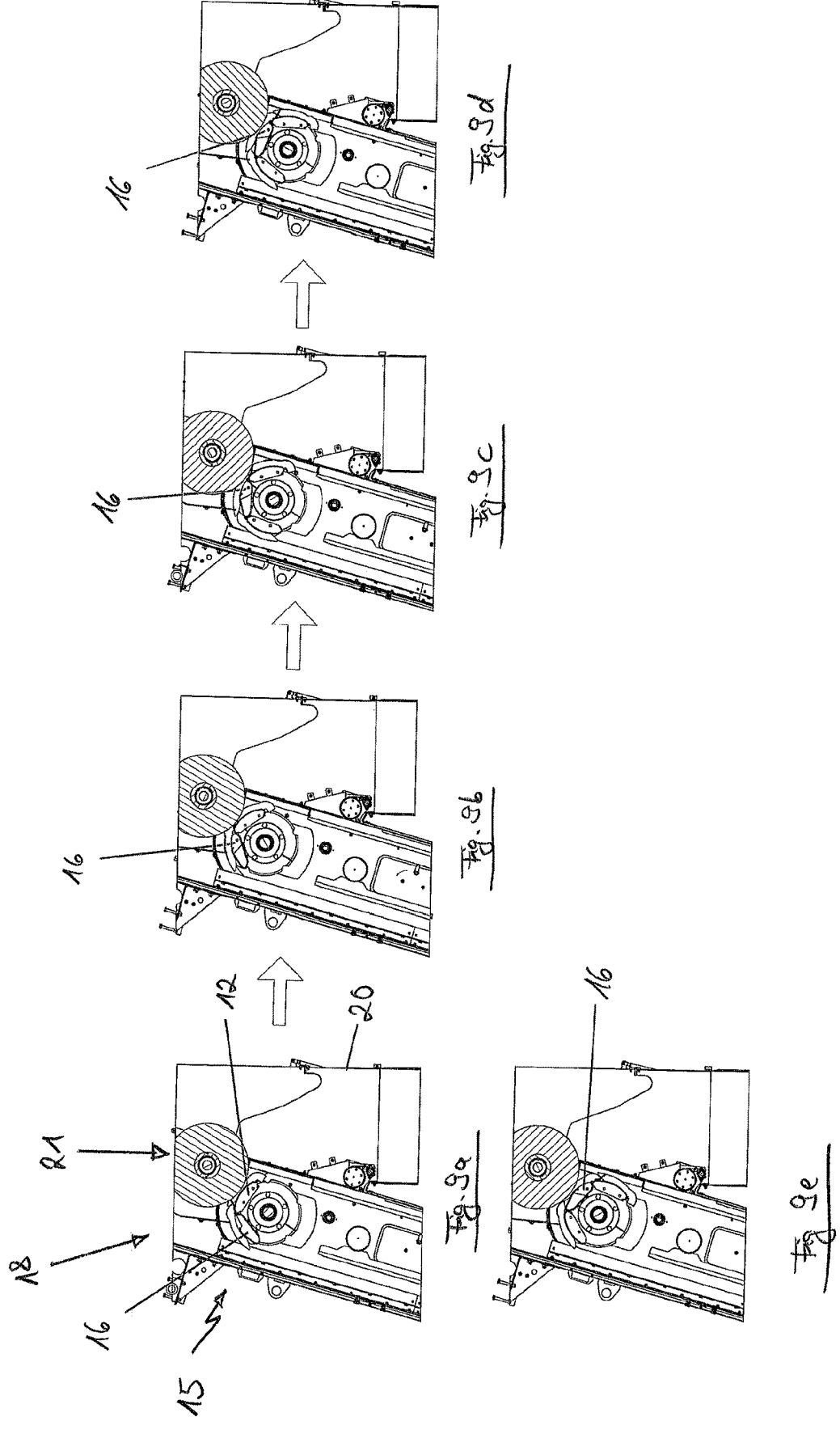

CONVEYOR-BELT FILTERING DEVICE FOR MECHANICALLY CLEANING A LIQUID

This application claims priority to German Patent Application No. 10 2022 101 756.7, filed Jan. 26, 2022, the entirety of the contents of which is incorporated by reference herein.

FIELD OF THE INVENTION

The invention relates to a conveyor-belt filtering device, in particular a filtering belt rake, for mechanically cleaning a liquid flowing in a channel and contaminated with solids and to a method for mechanically cleaning a liquid flowing in a channel and contaminated with solids by means of a conveyor-belt filtering device, in particular a filtering belt rake, the conveyor-belt filtering device comprising an endless filtering belt, which has at least one filtering element, preferably a plurality of filtering elements, which is designed to retain solids present in and contaminating the liquid, a frame and a lower deflection apparatus and at least one upper deflection apparatus, the endless filtering belt being guided and moveable via the lower deflection apparatus and the upper deflection apparatus, the endless filtering belt and the lower deflection apparatus and the upper deflection being disposed on the frame.

BACKGROUND OF THE INVENTION

A conveyor-belt filtering device of the make mentioned above, which is also referred to as a paternoster filter rake, is known from DE 10 2013 212 081 A1, for example, and serves especially for mechanically cleaning flowing sewage in channels formed for this purpose. Sewage flows through the filtering elements perpendicularly or also in a longitudinal direction of the filtering elements: the filtering elements carry filter material not able to pass the filtering elements out of the channel. In the area of an upper deflection apparatus of the conveyor-belt filtering device disposed above a sewage level, a wiper apparatus preferably realized as a rotating brush, for example, is provided which removes filter material adhering to the filtering elements from the filtering elements in a wiping process before it re-submerges again in the liquid flowing through the channel as a result of a revolution of the endless filtering belt.

Aside from the solids, which are present in and contaminate the liquid and are retained by means of the conveyor-belt filtering device of the make mentioned above for cleaning the liquid, foreign solids, in particular inorganic or mineral foreign solids, such as sand, stones, pebbles or the like, are regularly contained in the liquid and amass in an area of the lower deflection apparatus disposed in a bottom area of the channel, thus possibly resulting in disturbances and damage to the conveyor-belt filtering device. In particular, these foreign solids can accumulate more as a cause of heavy rainfalls and can be flooded directly to the conveyor-belt filtering device in large amounts by the liquid. This can lead to drivers of the filtering elements, by means of which the filtering elements are disposed on a conveyor chain of the endless filtering belt, being bent or torn off. Furthermore, the conveyor-belt filtering device of the make mentioned above commonly comprises a bottom seal in an area of the lower deflection apparatus, the bottom seal at least partially making contact with the endless filtering belt and being provided to prevent the liquid from circumnavigating the conveyor-belt filtering device in the area of the lower deflection apparatus unfiltered. If the bottom seal becomes more and more burdened by foreign solids amassing on the bottom seal, the bottom lets the filtering elements with the drivers only pass under increasing duress exerted by the conveyor-belt filtering device, which can lead to the damage to the filtering elements as previously mentioned. Furthermore, this can lead to an overload for the conveyor-belt filtering device, as a consequence of which a drive apparatus of the conveyor-belt filtering device is shut off, meaning the endless conveyor belt comes to a standstill. If such a failure of the conveyor-belt filtering device occurs, the liquid is commonly guided via an emergency overflow and circumnavigates the conveyor-belt filtering device unfiltered. Consequently, the liquid is supplied to other treatment devices following the conveyor-belt filtering device without further pre-cleaning and leads to significant operational disturbances there.

SUMMARY OF THE INVENTION

The object of the invention at hand is therefore to propose a conveyor-belt filtering device, in particular a filtering belt rake, for mechanically cleaning a liquid flowing in a channel and contaminated with solids and to propose a method for mechanically cleaning a liquid flowing in a channel and contaminated with solids by means of a conveyor-belt filtering device, in particular a filtering belt rake, which both allow reliably cleaning the liquid and maintaining operation of the conveyor-belt filtering device in the face of foreign solids, in particular sand, stones, pebbles or the like, contained in the liquid aside from solids contaminating the liquid.

The object is attained by a conveyor-belt filtering device having the features of claim 1.

The conveyor-belt filtering device, in particular filtering belt rake, for mechanically cleaning a liquid flowing in a channel and contaminated with solids comprises an endless filtering belt which has at least one filtering element, preferably a plurality of filtering elements, which is designed to retain solids present in and contaminating the liquid, a frame and a lower deflection apparatus and at least one upper deflection apparatus, the endless filtering belt being guided and moveable via the lower deflection apparatus and the upper deflection apparatus, the endless filtering belt and the lower deflection apparatus and the upper deflection being disposed on the frame, the endless filtering belt having at least one collecting element, which is designed for collecting foreign solids, in particular sand, stones, pebbles or the like, which are present in the liquid, in particular in an area of the lower deflection apparatus, which is preferably disposed in a bottom area of the channel, and differ essentially from solids present in and contaminating the liquid.

According to the invention, the conveyor-belt filtering device comprises an endless filtering belt, which, aside from at least one filtering element, has at least one collecting element, which is designed for collecting the foreign solids, in particular inorganic or mineral foreign solids, in particular sand, rocks, pebbles or the like. The foreign solids are essentially different to the solids contaminating the liquid. They can also be completely different to the solids. Generally, however, it cannot be precluded that solids are also collected more or less unintentionally partially by means of the collecting element provided for collecting foreign solids, meaning the foreign solids are only for the most part different to the solids. Advantageously, the endless filtering belt has a plurality of filtering elements. The filtering elements and the collecting element can together form the endless filtering belt and be connected to each other, preferably pivotally. For producing the endless filtering belt of the conveyor-belt filtering device according to the invention, an endless filtering belt of a conveyor-belt filtering device known from the state of the art, for example, can be used, at least one filtering element being replaced by a collecting element. Moreover, the conveyor-belt filtering device can comprise a drive apparatus, which can drive the endless filtering belt or put it into motion. The filtering elements are designed for retaining the solids present in and contaminating the liquid. For this purpose, the conveyor-belt filtering element can be disposed in such a manner in a channel that at least the lower deflection apparatus and a lower section of the endless filtering belt are below a liquid level. When disposing the conveyor-belt filtering element in the channel, the lower deflection apparatus is preferably disposed in a bottom area of the channel or in an area of a channel bottom. According to the invention, foreign solids which amass in the area of the lower deflection apparatus and are essentially different to the solids present in and contaminating the liquid can be regularly collected at least after each revolution of the endless filtering belt and can be discharged from the channel by means of the collecting element so that disturbances and damage to the conveyor-belt filtering device, in particular due to overload, can be prevented. In particular, this allows a reliable cleaning of the liquid even after heavy rainfalls. Depending on the length of the endless filtering belt, the endless filtering belt can have several collecting elements, for example two, three, four, five, six or seven, filtering elements. Furthermore, the conveyor-belt filtering device can comprise several upper deflection apparatus in order to allow a defined redirecting of the endless filtering belt in the area of a wiper apparatus, which the conveyor-belt filtering device can comprise. Advantageously, the upper deflection apparatus is disposed above the liquid level when the conveyor-belt filtering device is disposed in the channel.

Advantageously, the filtering element can have a perforation which is designed for liquid to flow through it and to retain solids. The perforation can comprise a plurality of openings or rather holes or rather passages through which the liquid, which is supplied from a supply side of the conveyor-belt filtering device or a headwater side of the channel, can flow to a discharge side of the conveyor-belt filtering device or a tail-water side of the channel. A size or a diameter of the openings or rather holes or rather passages can be dimensioned such that the solids cannot pass through there and are consequently retained.

In one embodiment of the invention, the perforation can further be designed for at least partially letting foreign solids pass. Hence, it is no longer necessary to collect all foreign solids by means of the collecting element, meaning the collecting element and/or the conveyor-belt filtering device can be unburdened additionally.

Advantageously, the filtering element can have a surface which is designed for adhering and dropping the solids. For this purpose, the surface can have the perforation. The surface can have a semi-circular shape, for example.

Advantageously, the filtering element and/or the collecting element can be made of metal, in particular stainless steel.

In a preferred embodiment of the invention, the collecting element can have a collecting bag which is designed for collecting and discharging the foreign solids, the collecting bag having an opening which enables the foreign solids to enter the collecting bag. The collecting bag can be designed in the manner of a collecting tray or collecting basket. The collecting bag can form a receiving room in which the foreign solids can be amassed and received.

Advantageously, the collecting bag can have a perforation, preferably on a bottom of the collecting bag or rather in a bottom wall of the collecting bag, the perforation being designed for enabling the liquid to exit the collecting bag via the opening. The collecting bag can then be filled entirely with the foreign solids.

In a constructively advantageous embodiment of the invention, the perforation can further be designed for enabling the foreign solids to exit the collecting bag at least partially. The foreign solids received in the collecting bag can thus fall onto or reach the filtering elements below the collecting element at least partially via the perforation during a movement of the endless filtering belt above the liquid level, during which the collecting element is moved upward toward the upper deflection apparatus on the supply side of the conveyor-belt filtering device. Subsequently, the foreign solids can reach the discharge side of the conveyor-belt filtering device from the supply side of the conveyor-belt filtering device via the perforation of the filtering elements in order to further reach a trap device, for example a sand trap or stone trap.

In one embodiment of the invention, the collecting element can have a rear wall, a front wall, a bottom wall, a top wall, a first lateral wall and a second lateral wall which together form the collecting bag, the opening extending between the first lateral wall and the second lateral wall and being formed in an upper area of a front side of the collecting element, the opening being bound by the top wall and the front wall. Consequently, the opening can extend across the entire length of the collecting element. Advantageously, the collecting element and the filtering element are formed to essentially match regarding a geometric shape, excepting the opening of the collecting element. The opening can be formed by the front wall being shorter than the rear wall, so that the front wall, measured from the bottom wall, is shorter in height than the rear wall. In particular the rear wall, the front wall, the bottom wall and the top wall can be formed in one piece, e.g., by reshaping or bending sheet metal accordingly. A base body of the collecting element obtained in this manner can be welded, bolted or screwed to the first lateral wall and the second lateral for forming the collecting element.

Advantageously, the endless filtering belt can have at least one conveyor chain, the filtering element and/or the collecting element having at least one driver by means of which the filtering element and/or the collecting element is disposed on the conveyor chain. The endless filtering belt can have two conveyor chains, a driver each being able to be disposed on a first lateral wall and on a second lateral wall of the filtering element or rather collecting element and being able to be engaged with one of the two conveyor chains. The drivers can be made in one piece with the lateral walls or be made separately from the lateral walls and be connected to the lateral walls, for example by means of a weld joint, bolt connection or screw connection.

Advantageously, the conveyor-belt filtering device can comprise a filter-material discharge apparatus, which has a dropping channel, in an area of the upper deflection apparatus. Consequently, the solids retained and discharged by means of the filtering element and forming filter material can be dropped in the area of the upper deflection apparatus. Equally, the foreign solids collected by means of the collection element can be dropped in the area of the upper deflection apparatus. The filtering element or collecting element moving toward the lower deflection apparatus after the filter-material discharge apparatus on the discharge side is consequently essentially cleared of solids and/or foreign solids before it re-submerges in the liquid flowing through the channel as a result of the further revolution of the endless filtering belt. Generally, it is also possible the liquid possibly present in the collecting element is poured from the collecting element or rather collecting bag in the area of the upper deflection apparatus as a result of the revolution of the endless filtering belt and reaches the filtering elements below the discharge side, whereby the liquid could be rinsed or cleaned additionally.

In an advantageous variation of the invention, the conveyor-belt filtering device can comprise a wiper apparatus, in particular a rotating brush, in an area of the upper deflection apparatus. The wiper apparatus can be disposed above the upper deflection apparatus on a wiper shaft. The wiper apparatus can be offset in the direction of the discharge side with respect to the upper deflection apparatus. Furthermore, the wiper apparatus can abut against a surface of the filtering element by means of a contact force in order to remove the solids discharged from the liquid and adhering to the surface from the surface. The removed or rather wiped solids can be dropped via the drop channel after.

Advantageously, the conveyor-belt filtering device can comprise a, preferably flexible, bottom seal in the area of the lower deflection apparatus, the bottom seal at least partially making contact with the endless filtering belt and being designed for preventing the liquid from circumnavigating the conveyor-belt filtering device in the area of the lower deflection apparatus. Consequently, the bottom seal prevents the liquid from passing the conveyor-belt filtering device between the endless filtering belt and a bottom of the channel unfiltered. Preferably, the bottom seal is designed to be flexible in such a manner that it is in tight sealing contact with the endless filtering belt or rather the filtering element or rather the collecting element despite the movement of the endless filtering belt. In this context, the bottom seal can be disposed on the frame.

In one embodiment of the invention, the bottom seal can comprise a brush and a sealing element which at least partially, preferably entirely, covers the brush and is made of a rubber-like material. In particular, the sealing element can exert evenly distributed pressure on the brush placed below. Advantageously, the sealing element can be formed as a rubber lip. The brush and the sealing element can have a tip which makes contact with the endless filtering belt or rather the filtering element or rather the collecting element.

In a constructively advantageous embodiment of the invention, the bottom seal can be engaged in such a manner for unburdening the bottom seal with the collecting element when the collecting element passes the bottom seal owing to a movement caused by the endless filtering belt that the foreign solids present on the bottom seal can be collected by means of the collecting element. Consequently, the foreign solids amassed on the bottom seal can be discharged from the channel during each revolution of the collecting element when it passes the bottom seal in order to unburden the bottom seal. Advantageously, the bottom seal can be engaged with the collecting element by the bottom seal at least partially folding over so as to engage, for example with the tip of the brush or of the sealing element, when the opening of the collecting bag of the collecting element passes the bottom seal, meaning that the foreign solids amassed on the bottom seal can enter the collecting bag.

Further advantageous embodiments of the conveyor-belt filtering device are derived from the descriptions of features of the dependent claims.

In the method according to the invention for mechanically cleaning a liquid flowing in a channel and contaminated with solids by means of a conveyor-belt filtering device, in particular a filtering belt rake, the conveyor-belt filtering device is disposed in the channel, the solids present in and contaminating the liquid being retained by means of at least one filtering element, preferably a plurality of filtering elements, of an endless filtering belt of the conveyor-belt filtering device, the endless filtering belt being guided and moved over a lower deflection apparatus of the conveyor-belt filtering device and at least one upper deflection apparatus of the conveyor-belt filtering device, the endless filtering belt and the lower deflection apparatus and the upper deflection apparatus being disposed on a frame of the conveyor-belt filtering device, foreign solids, in particular sand, stones, pebbles or the like, which are present in the liquid, in particular in an area of the lower deflection apparatus, which is preferably disposed in a bottom area of the channel, and differ essentially from solids present in and contaminating the liquid, are collected by means of at least one collecting element of the endless filtering belt. Reference is made to description of advantages of the conveyor-belt filtering device according to the invention for the advantageous effects of the method according to the invention.

Advantageously, a, preferably flexible, bottom seal of the conveyor-belt filtering device at least partially making contact with the endless filtering belt in the area of the lower deflection apparatus prevents that the liquid circumnavigates the conveyor-belt filtering device in the area of the lower deflection apparatus.

Further, the foreign solids can be amassed at least partially on the bottom seal, the bottom seal advantageously being engaged in such a manner for unburdening the bottom seal with the collecting element when the collecting element passes the bottom seal owing to a movement caused by the endless filtering belt that the foreign solids present on the bottom seal are collected by means of the collecting element.

Advantageously, the foreign solids can be at least partially dropped in an area of the upper deflection apparatus.

In a preferred variation of the method, the foreign solids collected by means of a collecting bag of the collecting element can exit the collecting bag at least partially via a perforation of the collecting bag, which is preferably present on a bottom of the collecting bag, on a supply side of the conveyor-belt filtering device, preferably above a liquid level, during a movement of the endless filtering belt and on a discharge side of the conveyor-belt filtering device via a perforation of the filtering element, which is present below the collecting element on the supply side and retains the solids.

Advantageously, the solids can be retained by a perforation of the filtering element, the solids adhering to a surface of the filtering element, being discharged and dropped in an area of the upper deflection apparatus.

Further advantageous embodiments of the method are derived from the description of features of the dependent claims referring to device claim 1.

BRIEF DESCRIPTION OF THE DRAWING FIGURE

In the following, preferred embodiments of the invention are described in more detail with reference to the attached drawings.

FIGS. 9a-9e show a detailed view of the conveyor-belt filtering device shown in FIG. 2 in the area of an upper deflection apparatus at points in time chronologically following one another within a partial revolution.

DETAILED DESCRIPTION

Figure 1:
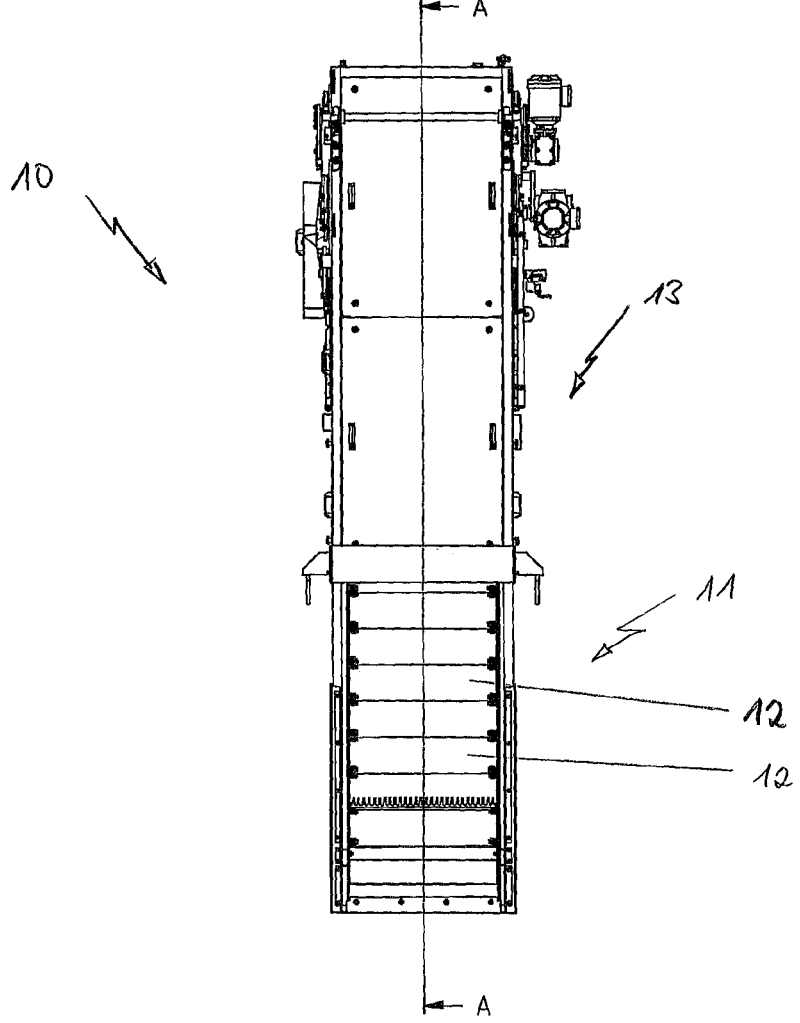
FIG. 1 shows a front view of a conveyor-belt filtering device.
Figure 2:
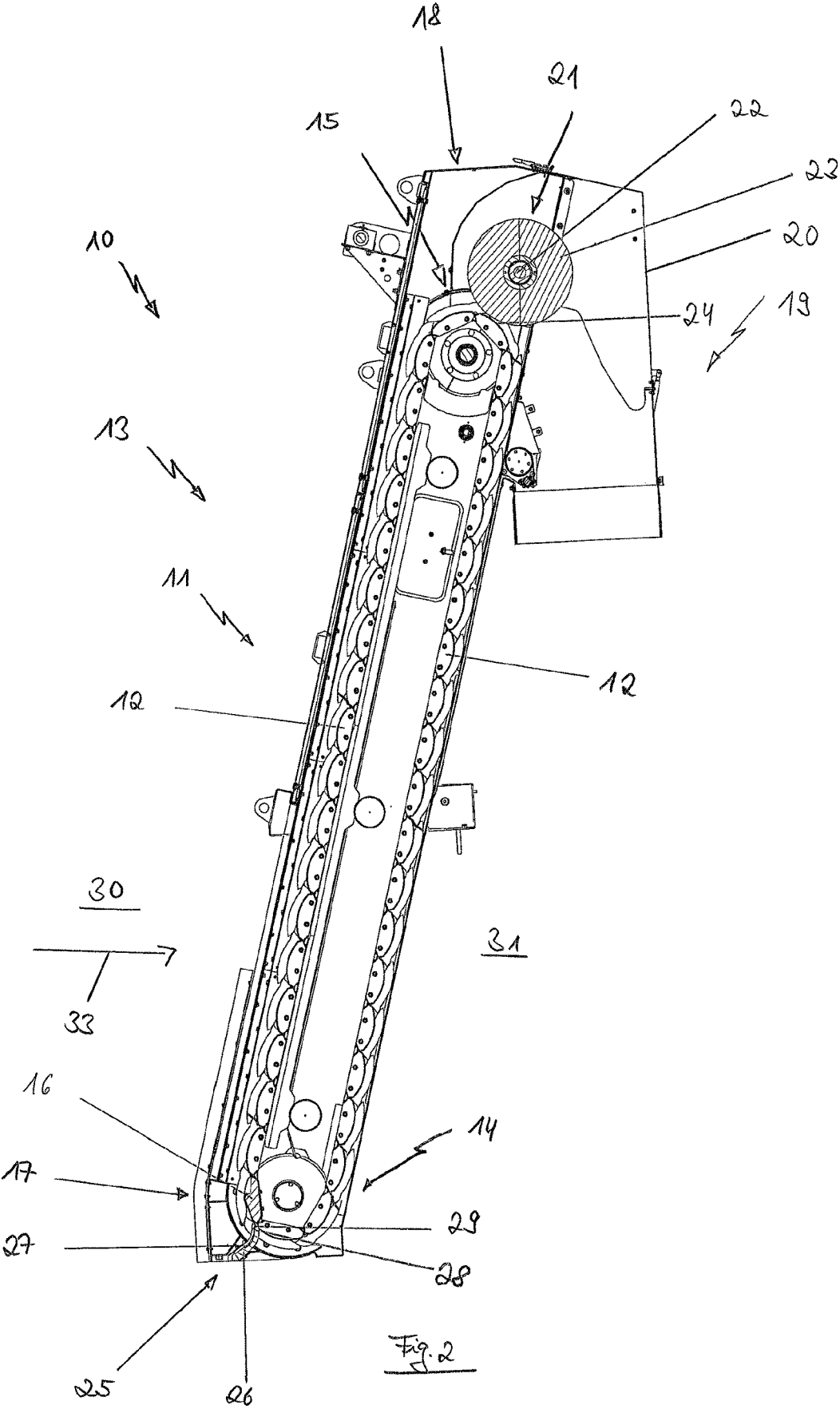
FIG. 2 shows a cross-sectional view of the conveyor-belt filtering device shown in FIG. 1 along an axis A-A.
Figures 3, 4, 5, 6, 7:
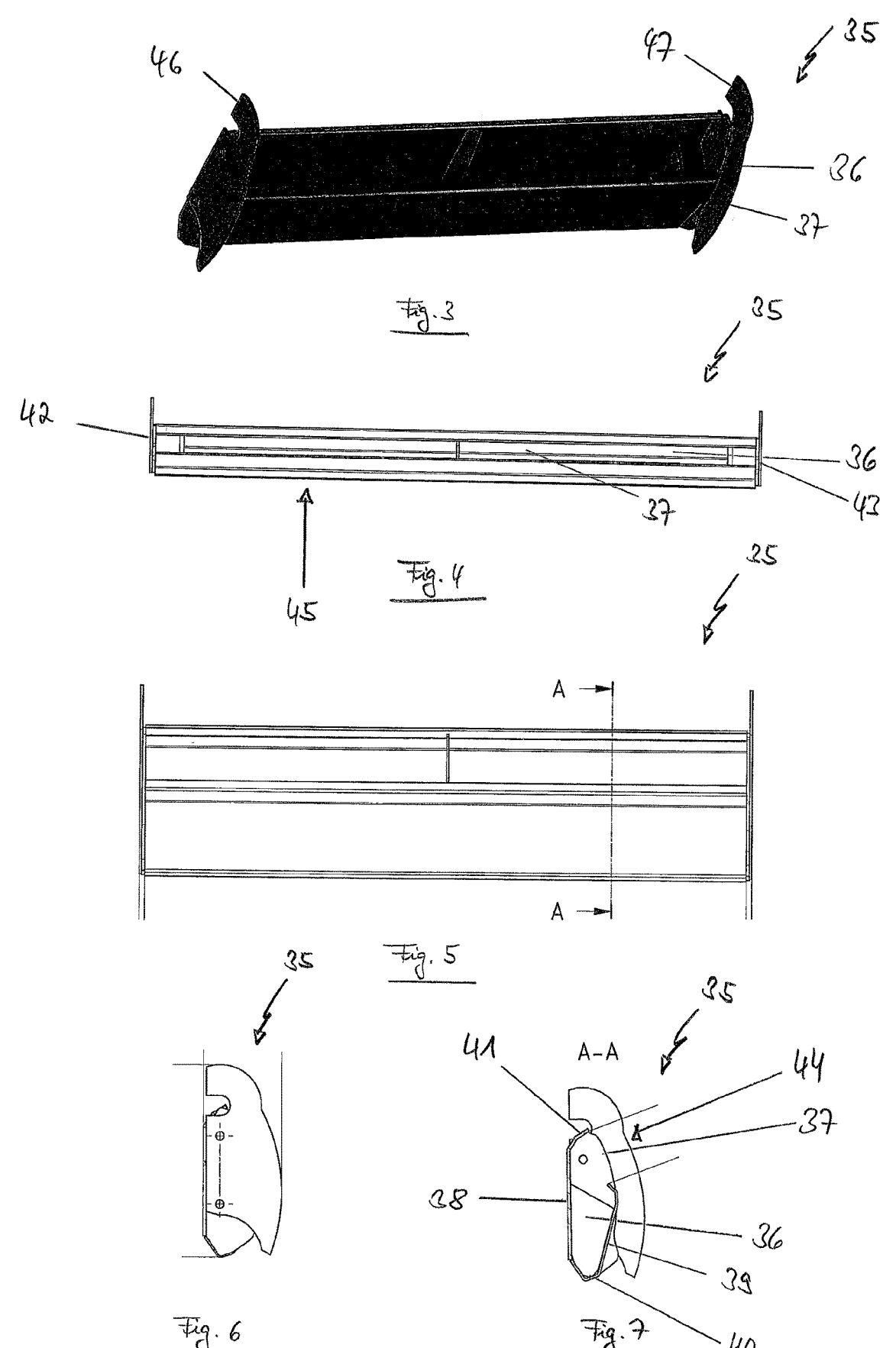
FIG. 3 shows a perspective view of a collecting element.
FIG. 4 shows a top view of the collecting element.
FIG. 5 shows a front view of the collecting element.
FIG. 6 shows a lateral view of the collecting element.
FIG. 7 shows a cross-sectional view of the collecting element shown in FIG. 5 along an axis A-A.

A combined view of FIGS. 1 and 2 shows a conveyor-belt filtering device 10 for mechanically cleaning a liquid flowing in a channel and contaminated with solids, conveyor-belt filtering device 10 comprising an endless filtering belt 11 which has a plurality of filtering elements 12 designed for retaining solids present in and contaminating the liquid, a frame 13 and a lower deflection apparatus 14 and an upper deflection apparatus 15, endless filtering belt 11 being guided and moveable over lower deflection apparatus 14 and upper deflection apparatus 15, endless filtering belt 11 and lower deflection apparatus 14 and upper deflection apparatus 15 being disposed on frame 13. Furthermore, endless filtering belt 11 has a collecting element 16 which is designed for collecting foreign solids, in particular sand, stones, pebbles or the like, which are present in the liquid, in particular in an area 17 of the lower deflection apparatus 14, which is preferably disposed in a bottom area of the channel, and differ essentially from solids present in and contaminating the liquid.

Furthermore, conveyor-belt filtering device 10 comprises a filter-material discharge apparatus 19 in an area 18 of upper deflection apparatus 15, filter-material discharge apparatus 19 having a drop channel 20. Further, conveyor-belt filtering device 10 comprises a wiper apparatus 21, which is formed having a rotating brush 23 disposed on a wiper shaft 22, in area 18 of upper deflection apparatus 15. Brush 23 abuts against a surface 24 of filtering elements 12 passing brush 23 by means of a contact force.

In area 17 of lower deflection apparatus 14, conveyor-belt filtering device 10 further comprises a flexible bottom seal 25 which partially makes contact with endless filtering belt 11 and is designed for preventing the liquid from circumnavigating conveyor-belt filtering device 10 in area 17 of lower deflection apparatus 14 unfiltered. Bottom seal 25 has a brush 26 and a sealing element 27 made of a rubber-like material and completely covering brush 26. A tip 28 of brush 26 and a tip 29 of sealing element 27 continuously make contact with filtering elements 12 passing bottom seal 25 or rather collecting elements 16 passing bottom seal 25 so that the liquid cannot reach a discharge side 31 of conveyor-belt filtering device 10 from a supply side 30 of conveyor-belt filtering device 10 unfiltered.

Conveyor-belt filtering device 10 can be disposed in the channel in which the liquid contaminated with solids flows. In this context, conveyor-belt filtering device 10 can be disposed in such a manner in the channel that at least one lower section of conveyor-belt filtering device 10 is disposed in the channel below a liquid level, the lower section comprising lower deflection apparatus 14, lower deflection apparatus 14 being disposed in a bottom area of the channel.

Endless filtering belt 11 is moveable in such a manner that filtering elements 12 and collecting elements 16 can be moved on supply side 30 from lower deflection apparatus 14 towards upper deflection apparatus 15 and on discharge side 31 from upper deflection apparatus 15 towards lower deflection apparatus 14. The liquid can flow through filtering elements 12 in the direction of a flow direction 33, the solids contaminating the liquid adhering to surface 24 of filtering elements 12 presently on supply side 30 and being able to be discharged from the channel. In area 18 of upper deflection apparatus 15, the solids adhering to surface 24 are wiped by means of wiper apparatus 21, the solids being dropped via drop channel 20.

Figures 8A, 8B, 8C, 8D, 8E, 8F, 8G, 8H, 8I, 8J, 8K, 8L, 8M, 8N:
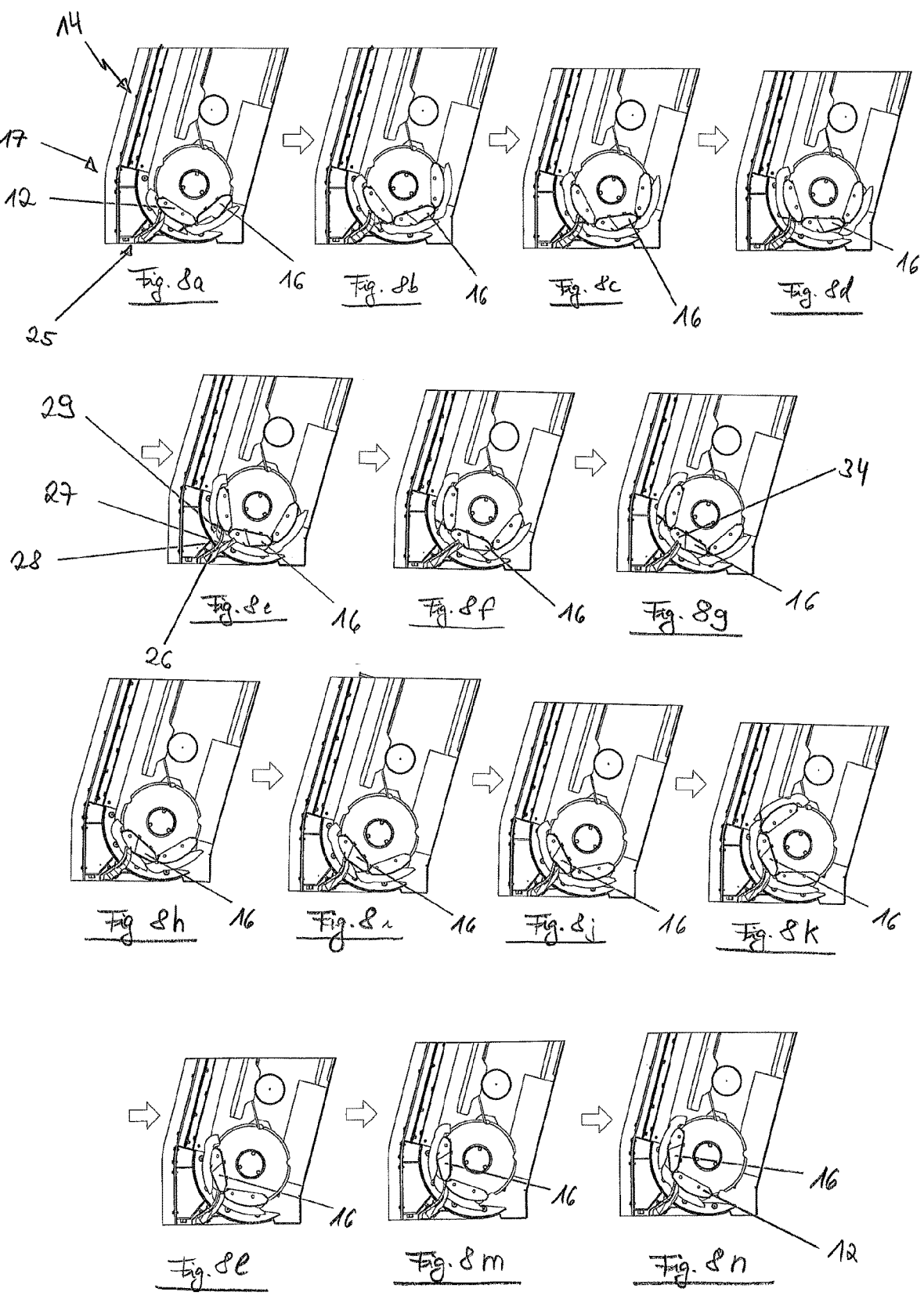
FIGS. 8a-8n show a detailed view of the conveyor-belt filtering device shown in FIG. 2 in the area of a lower deflection apparatus at points in time chronologically following one another within a partial revolution.

A combined view of FIGS. 8a to 8n shows a detailed view of conveyor-belt filtering device 10 in area 17 of lower deflection apparatus 14 at points in time chronologically following one another within a partial revolution. It is in particular shown in what manner collecting element 16 gradually passes bottom seal 25 owing to a movement caused by endless filtering belt 11. FIGS. 8a to 8d initially show that tip 28 of brush 26 and tip 29 of sealing element 27 make contact with filtering element 12. In FIG. 8e, collecting element 16 has reached bottom seal 25 and brush 26 folds in an opening 34 of a collecting bag (not illustrated) of collecting element 16 in an engaging manner. During further movement of endless filtering belt 11, sealing element 27 subsequently folds, as shown in FIG. 8f, in opening 34 in an engaging manner, meaning foreign solids, such as sand, stones, pebbles or the like, amassed on bottom seal 25 can enter the collecting bag, while tip 28 and tip 29 engage in opening 34, as shown in FIGS. 8g to 8i. Upon further revolution of endless filtering belt 22, collecting element 16 is moved toward upper deflection apparatus 15, bottom seal coming into contact with filtering element 12 subsequent to collecting element 16, as shown in FIGS. 8j to 8n.

A combined view of FIGS. 9a to 9e shows a detailed view of conveyor-belt filtering device 10 in area 18 of upper deflection apparatus 15 at points in time chronologically following one another within a partial revolution. It is shown in what manner collecting element 16 gradually passes wiper apparatus 21, the foreign solids collected by means of collecting element 16 being dropped at least partially via drop channel 20.

Furthermore, a combined view of FIGS. 2, 8a to 8n and 9a to 9e shows that collecting element 16, excepting opening 34, is formed so as to essentially match filtering elements 12 with regards to a geometric shape.

A combined view of FIGS. 3 to 7 shows a collecting element 35 which has a collecting bag 36 designed for collecting and discharging foreign solids, collecting bag 36 having an opening 37 which allows the foreign solids to enter collecting bag 36. Collecting element 35 has a rear wall 38, a front wall 39, a bottom wall 40, a top wall 41, a first lateral wall 42 and a second wall 43, which together form collecting bag 36, opening 37 extending between first lateral wall 42 and second lateral wall 43 and being formed in an upper area 44 of a front side 45 of collecting element 35, opening 37 being bound by top wall 41 and front wall 39. Front wall 39 is shorter compared to rear wall 38. Furthermore, collecting element 35 has a driver 46 and 47 on first lateral wall 42 and second lateral wall 43, respectively, by means of which collecting element 35 can be disposed on a conveyor chain of an endless filtering belt of a conveyor-belt filtering device. Driver 46 and 47 can be connected to first lateral wall 42 and second lateral wall 43, respectively, by means of a weld connection, a bolt connection or a screw connection.

The invention claimed is:

1. A conveyor-belt filtering device adapted for mechanically cleaning a liquid flowing in a channel and contaminated with solids, the conveyor-belt filtering device comprising:

an endless filtering belt having at least one filtering element adapted to retain solids present in and contaminating the liquid;

a frame;

a lower deflection apparatus; and at least one upper deflection apparatus, wherein the endless filtering belt is guided and moveable via the lower deflection apparatus and the upper deflection apparatus, and wherein the endless filtering belt, the lower deflection apparatus and the upper deflection are disposed on the frame, the endless filtering belt has at least one collecting element adapted for collecting inorganic or mineral foreign solids including sand, stones, and pebbles, which are present in the liquid, in an area of the lower deflection apparatus disposed in a bottom area of the channel, and differ from solids present in and contaminating the liquid and wherein (a) the at least one filtering element has a surface adapted for adhering and discharging solids, (b) the at least one collecting element has a collecting bag adapted for collecting and discharging the foreign solids, the collecting bag having an opening adapted to allow the foreign solids to enter the collecting bag, (c) the conveyor-belt filtering device comprises a bottom seal in the area of the lower deflection apparatus, the bottom seal at least partially making contact with the endless filtering belt and being adapted for preventing the liquid from circumnavigating the conveyor-belt filtering device in the area of the lower deflection apparatus, and (d) the bottom seal is able to be engaged in such a manner for unburdening the bottom seal with the at least one collecting element when the at least one collecting element passes the bottom seal owing to a movement caused by the endless filtering belt so that the foreign solids present on the bottom seal are collected by means of the at least one collecting element.

2. The conveyor-belt filtering device according to claim 1, wherein the at least one filtering element has a perforation adapted for liquid to flow through while retaining solids.

3. The conveyor-belt filtering device according to claim 2, wherein the perforation is further adapted for at least partially letting foreign solids pass.

4. The conveyor-belt filtering device according to claim 1, wherein the collecting bag has a perforation, preferably on a bottom of the collecting bag, the perforation being adapted for enabling the liquid having entered the collecting bag via the opening to exit the collecting bag.

5. The conveyor-belt filtering device according to claim 4, wherein the perforation is further adapted for enabling the foreign solids to at least partially exit the collecting bag.

6. The conveyor-belt filtering device according to claim 1 wherein the collecting element has a rear wall, a front wall, a bottom wall, a top wall, a first lateral wall and a second lateral wall, which together form the collecting bag, the opening extending between the first lateral wall and the second lateral wall and being formed in an upper area of a front side of the at least one collecting element, the opening being bound by the top wall and the front wall.

7. The conveyor-belt filtering device according to claim 1, wherein the endless filtering belt has at least one conveyor chain, the at least one filtering element and/or the at least one collecting element having at least one driver, whereby the at least one filtering element and/or the at least one collecting element is disposed on the conveyor chain.

8. The conveyor-belt filtering device according to claim 1, wherein the conveyor-belt filtering device comprises a filter-material discharge device having a dropping channel in an area of the upper deflection apparatus.

9. The conveyor-belt filtering device according to claim 1, wherein the conveyor-belt filtering device comprises a wiping apparatus, in an area of the upper deflection apparatus.

10. The conveyor-belt filtering device according to claim 1, wherein the bottom seal has a brush and a seal element made of a rubber-like material and at least partially covering the brush.

* * * * *